United States Patent
Sato et al.

(10) Patent No.: US 12,024,637 B2
(45) Date of Patent: Jul. 2, 2024

(54) PRIMER COMPOSITION, PRIMER LAYER, INK SET, PRINTED MATTER, AND IMAGE FORMATION METHOD

(71) Applicant: SAKATA INX CORPORATION, Osaka (JP)

(72) Inventors: Yoichi Sato, Osaka (JP); Hirohito Maeda, Osaka (JP); Kazuki Moriyasu, Osaka (JP); Eri Ueda, Osaka (JP); Takaaki Sano, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 5 days.

(21) Appl. No.: 17/995,910

(22) PCT Filed: Mar. 30, 2021

(86) PCT No.: PCT/JP2021/013527
§ 371 (c)(1),
(2) Date: Oct. 10, 2022

(87) PCT Pub. No.: WO2022/024460
PCT Pub. Date: Feb. 3, 2022

(65) Prior Publication Data
US 2023/0193068 A1 Jun. 22, 2023

(30) Foreign Application Priority Data
Jul. 28, 2020 (JP) ................... 2020-126953

(51) Int. Cl.
| | | |
|---|---|---|
| C09D 11/54 | (2014.01) | |
| B41J 2/01 | (2006.01) | |
| C09D 5/00 | (2006.01) | |
| C09D 11/38 | (2014.01) | |
| C09D 11/40 | (2014.01) | |

(52) U.S. Cl.
CPC ........... C09D 11/54 (2013.01); B41J 2/01 (2013.01); C09D 5/002 (2013.01); C09D 11/38 (2013.01); C09D 11/40 (2013.01)

(58) Field of Classification Search
CPC ....... C09D 11/54; C09D 11/322; C09D 11/38; C09D 11/30; C09D 11/40; C09D 7/63; C09D 7/61; C09D 11/107; C09D 171/02; C09D 11/102; C09D 5/002; C09D 7/45; C09D 5/024; B41M 5/0017; B41M 5/52; B41M 5/5254; B41J 2/2107; B41J 2/01
See application file for complete search history.

(56) References Cited

U.S. PATENT DOCUMENTS

| | | | | |
|---|---|---|---|---|
| 2011/0102497 | A1* | 5/2011 | Sato | ........................ D06P 1/445 252/8.81 |
| 2016/0318299 | A1 | 11/2016 | Arai et al. | |
| 2017/0088739 | A1 | 3/2017 | Yamashita et al. | |
| 2018/0148591 | A1* | 5/2018 | Ozawa | ..................... C09D 11/40 |
| 2020/0070554 | A1 | 3/2020 | Maegawa et al. | |
| 2020/0239721 | A1 | 7/2020 | Sato et al. | |
| 2021/0130639 | A1 | 5/2021 | Sugihara et al. | |

FOREIGN PATENT DOCUMENTS

| | | |
|---|---|---|
| JP | 2009-262549 A | 11/2009 |
| JP | 2017-061124 A | 3/2017 |
| JP | 2017-088646 A | 5/2017 |
| JP | 2018-012219 A | 1/2018 |
| JP | 2019-073608 A | 5/2019 |
| JP | 2019-111763 A | 7/2019 |
| WO | WO 2018/181527 A1 | 10/2018 |

OTHER PUBLICATIONS

Extended European Search report received in European Patent Application No. 21849062.1 dated Jul. 20, 2023.
Notification of Transmittal of Translation of IPRP and IPRP, form PCT/IB/338 and PCT/IB/373 received in PCT/JP2021/013527, mailed Feb. 9, 2023.
International Search Report issued in Application No. PCT/JP2021/013527, dated Jun. 22, 2021.
Office Action issued in Canadian Patent Application No. 3,177,536 dated Apr. 4, 2024.

* cited by examiner

*Primary Examiner* — Jannelle M Lebron
(74) *Attorney, Agent, or Firm* — Knobbe, Martens, Olson & Bear, LLP

(57) ABSTRACT

A primer composition including a resin emulsion, an aggregation accelerator, a surfactant, and water, the surfactant containing one or more of acetylene-based surfactants and silicone-based surfactants, and a nonionic surfactant other than the surfactant, the nonionic surfactant having an HLB value of 10 or above and below 15.5 and having multiple polyoxyalkylene groups, and the proportion of the nonionic surfactant in the primer composition is 3 mass % or below. The primer composition has excellent storage stability and makes it possible to form a primer layer that has excellent transparency and that produces excellent bleeding resistance and printability when a solid image is printed by an aqueous inkjet ink composition.

6 Claims, No Drawings

PRIMER COMPOSITION, PRIMER LAYER, INK SET, PRINTED MATTER, AND IMAGE FORMATION METHOD

This application is the U.S. National Phase under 35 U.S.C. § 371 of International Application PCT/JP2021/013527, filed Mar. 30, 2021, designating the U.S., and published in Japanese as WO 2022/024460 on Feb. 3, 2022, which claims priority to Japanese Patent Application No. 2020-126953, filed Jul. 28, 2020, the entire content of which is incorporated herein by reference.

TECHNICAL FIELD

The present invention relates to a primer composition, a primer layer, an ink set, a printed matter, and an image formation method.

BACKGROUND ART

There is known a printing method using an ink set, which includes an aqueous inkjet ink composition containing a pigment and the like; and a primer composition containing an aggregation accelerator that accelerates aggregation of the aqueous inkjet ink composition (Patent Documents 1 to 5).

These patent documents disclose that the primer composition exhibits favorable storage stability, and a favorable print image quality (print layer) without bleeding and the like can be formed when fine line printing is performed on the primer layer formed from the primer composition using the aqueous inkjet ink composition.

PRIOR ART DOCUMENT

Patent Documents

Patent Document 1: JP-A-2017-61124
Patent Document 2: JP-A-2019-111763
Patent Document 3: JP-A-2017-88646
Patent Document 4: JP-A-2018-12219
Patent Document 5: JP-A-2019-73608

SUMMARY OF THE INVENTION

Problems to be Solved by the Invention

Meanwhile, inkjet printing is non-contact printing, and there is thus a problem that streaks of the solid image (solid part) are conspicuous and the deterioration of image quality becomes remarkable in a case where the dots of the aqueous inkjet ink composition do not spread sufficiently on the primer layer when a solid image (solid part) is printed. The primer compositions disclosed in the patent documents have room for improvement in these properties.

In a case where the primer composition is applied to a highly transparent substrate such as a film, the primer layer is also required to exhibit high transparency.

The present invention has been made in view of the circumstances, and an object thereof is to provide a primer composition, which exhibits excellent storage stability, affords excellent printability and bleeding resistance of a solid image formed from an aqueous inkjet ink composition, and can form a highly transparent primer layer.

Another object of the present invention is to provide an ink set including the primer composition and the aqueous inkjet ink composition, a printed matter obtained by performing printing using the ink set, and an image formation method in which the ink set is used.

Means for Solving the Problems

In other words, the present invention relates to a primer composition containing a resin emulsion, an aggregation accelerator, a surfactant, and water, in which the surfactant contains one or more surfactants (A) selected from the group consisting of an acetylene-based surfactant and a silicone-based surfactant and a nonionic surfactant (B) other than the surfactant (A), the nonionic surfactant (B) has an HLB value of 10 or more and less than 15.5 and a plurality of polyoxyalkylene groups in the molecule, and the proportion of the nonionic surfactant (B) in the primer composition is 3% by mass or less.

The present invention also relates to a primer layer formed from the primer composition.

The present invention also relates to an ink set including the primer composition and an aqueous inkjet ink composition.

The present invention also relates to a printed matter obtained by performing printing using the ink set.

The present invention also relates to an image formation method in which the ink set is used.

Effect of the Invention

The details of the mechanism of action of the effects in the primer composition of the present invention are presumed as follows although a part thereof is unclear. However, the present invention is not limited to this mechanism of action.

The primer composition of the present invention contains a resin emulsion, an aggregation accelerator, a surfactant, and water, in which the surfactant contains one or more surfactants (A) selected from the group consisting of an acetylene-based surfactant and a silicone-based surfactant and a nonionic surfactant (B) other than the surfactant (A), the nonionic surfactant (B) has an HLB value of 10 or more and less than 15.5 and a plurality of polyoxyalkylene groups (two or more polyoxyalkylene chains) in the molecule, and the proportion of the nonionic surfactant (B) in the primer composition is 3% by mass or less. As described in the prior art documents, the use of the surfactant (A) as a surfactant of a primer composition has been specifically disclosed, but concurrent use of the surfactant (A) with the nonionic surfactant (B) has not been disclosed at all. In particular, the nonionic surfactant disclosed in Patent Document 1 has an HLB value of 15.5 or more and 20 or less, the nonionic surfactant disclosed in Patent Document 2 has one polyoxyalkylene group (one polyoxyalkylene chain) in the molecule, and thus these are different from the nonionic surfactant (B) of the present invention. In the primer composition of the present invention, the aggregation effect by the aggregation accelerator is alleviated by concurrent use of the surfactants (A) and (B), thus a greater effect of improving leveling property is obtained, and this leads to excellent printability and bleeding resistance of a solid image formed from an aqueous inkjet ink composition. Use of a specific amount of the nonionic surfactant (B) having the HLB value leads to excellent storage stability and formation of a highly transparent primer layer.

MODE FOR CARRYING OUT THE INVENTION

The primer composition of the present invention contains a resin emulsion, an aggregation accelerator, a surfactant, and water.

<Resin Emulsion>

As the resin emulsion, known ones contained in primer compositions used in aqueous inkjet ink compositions can be used, and examples of the resin emulsion include an acrylic resin emulsion, a polyester-based resin emulsion, a polyurethane-based resin emulsion, a polyvinyl acetate-based resin emulsion, a polyvinyl chloride-based resin emulsion, a polybutadiene-based resin emulsion, and a polyolefin-based resin emulsion. Among these, an acrylic resin emulsion, a polyester-based resin emulsion, a polyvinyl acetate-based resin emulsion, and a polyolefin-based resin emulsion are preferable. The resin emulsions can be used singly or in combination of two or more kinds thereof.

Examples of the acrylic resin emulsion include an acrylic resin emulsion, a styrene-acrylic resin emulsion, an acrylic-vinyl acetate-based resin emulsion, an acrylic-vinyl chloride-based resin emulsion, an acrylic-silicone-based resin emulsion, and an acrylic-colloidal silica-based resin emulsion, and among these, a styrene-acrylic resin emulsion is preferable. The glass transition temperature of the resin contained in the acrylic resin emulsion, the glass transition temperature is preferably 0° C. or less.

The polyester-based resin emulsion is only required to have a polyester skeleton, but the polyester-based polyurethane resin emulsion disclosed in JP-A-2020-75954 is preferable from the viewpoint of improving the adhesion to the substrate.

With regard to the polyvinyl acetate-based resin emulsion, the glass transition temperature of the resin contained in the polyvinyl acetate-based resin emulsion is preferably 0° C. or more and 50° C. or less from the viewpoint of favorable adhesion to the medium to be recorded.

As the polyolefin-based resin emulsion, a chlorinated polyolefin-based resin emulsion obtained by chlorinating and emulsifying a polyolefin resin is preferable. Examples of the chlorinated polyolefin-based resin emulsion include a chlorinated polypropylene resin emulsion and a chlorinated polyethylene resin emulsion, and the degree of chlorination is preferably 15 to 30%.

The content of resin solids in the resin emulsion is usually preferably 0.5% by mass or more, more preferably 1% by mass or more in the primer composition from the viewpoint of improving bleeding resistance, and is preferably 10% by mass or less, more preferably 5% by mass or less in the primer composition from the viewpoint of improving storage stability.

<Aggregation Accelerator>

As the aggregation accelerator, known ones contained in primer compositions used in aqueous inkjet ink compositions can be used, and examples of the aggregation accelerator include water-soluble polyvalent metal salts, organic acids, and cationic polymers. The aggregation accelerators can be used singly or in combination of two or more kinds thereof.

Examples of the water-soluble polyvalent metal salts include salts, which tend to be dissociated and are composed of metals such as magnesium, calcium, strontium, zinc, copper, iron, and aluminum and organic acids or inorganic acids. Examples of the organic acids include fatty acids represented by RCOOH (where R is hydrogen or an organic group having 1 to 30 carbon atoms). Examples of the inorganic acids include nitric acid, sulfuric acid, hydrogen chloride (hydrochloric acid), hydrogen bromide, hydrogen iodide, chloric acid, bromic acid, carbonic acid, and phosphoric acid. Specific examples of the water-soluble polyvalent metal salts include calcium acetate, calcium chloride, and magnesium chloride.

Examples of the organic acids include lactic acid, malic acid, citric acid, oxalic acid, malonic acid, acetic acid, propionic acid, and fumaric acid.

Examples of the cationic polymers include a polymer having a primary to tertiary amino group and a polymer having a quaternary ammonium salt group. Specific examples of the cationic polymer include a homopolymer of a monomer (cationic monomer) having a primary to tertiary amino group, a salt thereof, or a quaternary ammonium salt group, and a copolymer or a condensation polymer of the cationic monomer and another monomer (hereinafter, referred to as a "non-cationic monomer"). The cationic polymer can be used in any form of a water-soluble polymer or water-dispersible latex particles.

The content of the aggregation accelerator is preferably 0.05% by mass or more, preferably 0.5% by mass or more, still more preferably 1% by mass or more in the primer composition from the viewpoint of improving the clearness and bleeding resistance of printed matter, and the content of the aggregation accelerator is preferably 15% by mass or less, more preferably 10% by mass or less, still more preferably 8% by mass or less in the primer composition from the viewpoint of improving storage stability.

<Surfactant>

The surfactant contains one or more surfactants (A) selected from the group consisting of an acetylene-based surfactant and a silicone-based surfactant and a nonionic surfactant (B) other than the surfactant (A).

<Surfactant (A)>

The surfactant (A) is one or more surfactants selected from the group consisting of an acetylene-based surfactant and a silicone-based surfactant. The surfactants (A) can be used singly or in combination of two or more kinds thereof.

As the acetylene-based surfactant, known ones contained in primer compositions used in aqueous inkjet ink compositions can be used, and examples of the acetylene-based surfactant as commercial products include "DYNOL 607", "DYNOL 609", "OLFINE E-1004", "OLFINE E-1010", "OLFINE E-1020", "OLFINE PD-001", "OLFINE PD-002W", "OLFINE PD-004", "OLFINE PD-005", "OLFINE EXP. 4001", "OLFINE EXP. 4200", "OLFINE EXP. 4123", and "OLFINE EXP. 4300" (all manufactured by Nisshin Chemical Industry Co., Ltd.); and "SURFYNOL 104E", "SURFYNOL 104H", "SURFYNOL 104A", "SURFYNOL 104BC", "SURFYNOL 104DPM", "SURFYNOL 104PA", "SURFYNOL 104PG-50", "SURFYNOL 420", "SURFYNOL 440", and "SURFYNOL 465" (all manufactured by Evonik Industries AG).

As the silicone-based surfactant, known ones contained in primer compositions used in aqueous inkjet ink compositions can be used, and examples of the silicone-based surfactant include "BYK-307", "BYK-333", "BYK-347", "BYK-348", "BYK-349", "BYK-345", "BYK-378", and "BYK-3455" (all manufactured by BYK).

<Nonionic Surfactant (B)>

The nonionic surfactant (B) is a nonionic surfactant other than the surfactant (A), and has an HLB value of 10 or more and less than 15.5 and a plurality of polyoxyalkylene groups in the molecule. The surfactants (B) can be used singly or in combination of two or more kinds thereof.

The nonionic surfactant (B) has an HLB value of 10 or more and less than 15.5, and has an HLB value of preferably 11 or more, more preferably 12 or more from the viewpoint of improving storage stability. As disclosed in Patent Documents 1 and 2 above, the HLB value is an index indicating the degree of hydrophilicity and lipophilicity of surfactant and is calculated by the Griffin's method, and the HLB value indicates that the lipophilicity is higher as the HLB value is smaller and the hydrophilicity is higher as the HLB value is larger.

The nonionic surfactant (B) has a plurality of polyoxyalkylene groups (two or more polyoxyalkylene chains) in the molecule. The nonionic surfactant (B) preferably has at least a polyoxyethylene group from the viewpoint of improving the printability and bleeding resistance of a solid image formed from an aqueous inkjet ink composition. In the present specification, for example, a polyoxyalkylene group in which a polyoxyethylene group and a polyoxypropylene group are directly linked (added) is counted as one group.

The molecular skeleton of the nonionic surfactant (B) is not limited at all as long as the nonionic surfactant (B) has the HLB value and a plurality of polyoxyalkylene groups (two or more polyoxyalkylene chains) in the molecule, and examples of the nonionic surfactant (B) include a polyoxyalkylene group-containing fatty acid glyceryl, a polyoxyalkylene group-containing aliphatic amine, and a polyoxyalkylene group-containing sorbitan fatty acid ester.

The content of the surfactant (A) is preferably 0.005% by mass or more, preferably 0.01% by mass or more, still more preferably 0.1% by mass or more in the primer composition from the viewpoint of improving printability of the primer composition, and the content of the surfactant (A) is preferably 2% by mass or less, more preferably 1.5% by mass or less, still more preferably 1% by mass or less in the primer composition from the viewpoint of improving bleeding resistance.

The content of the nonionic surfactant (B) is 3% by mass or less in the primer composition. The content of the nonionic surfactant (B) is preferably 0.005% by mass or more, preferably 0.01% by mass or more, still more preferably 0.1% by mass or more in the primer composition from the viewpoint of improving the printability of solid image, and the content of the nonionic surfactant (B) is preferably 2% by mass or less, more preferably 1.5% by mass or less, still more preferably 1% by mass or less in the primer composition from the viewpoint of improving the bleeding resistance and the transparency of primer layer.

The mass ratio of the surfactant (A) to the nonionic surfactant (B) (surfactant (A)/nonionic surfactant (B)) is preferably 0.01 or more, more preferably 0.1 or more and preferably 100 or less, more preferably 10 or less from the viewpoint of improving the printability of primer composition, the printability and bleeding resistance of solid image, and the transparency of primer layer.

<Water>

The water includes water contained in the resin emulsion, water added to adjust the concentration of the primer composition of the present invention, and the like. Examples of the water include ion exchanged water, pure water, distilled water, and industrial water. The water can be used singly or in combination of two or more kinds thereof.

The proportion of the water (including water contained in each component) is preferably 70% by mass or more, more preferably 80% by mass or more from the viewpoint of improving the drying property of coating film, and is preferably 98% by mass or less, more preferably 95% by mass or less from the viewpoint of improving discharge stability.

The primer composition may contain a hydrazide compound since the adhesion between the primer and the substrate is improved by interaction with the substrate surface. The hydrazine compound is preferably a dihydrazide compound, and examples thereof include oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide, and itaconic acid dihydrazide. The content of the hydrazide compound is usually about 0.2% by mass or more and 5% by mass or less in the primer composition.

The primer composition of the present invention may contain an optional component in addition to the components described above if necessary. Examples of the optional component include a water-soluble organic solvent and various additives. Examples of the additives include a preservability improver, a defoaming agent, an adhesive property imparting agent, a filler, and a thickener.

Examples of the water-soluble organic solvent include monoalcohols, polyhydric alcohols, lower alkyl ethers of polyhydric alcohols, ketones, ethers, esters, and nitrogen-containing compounds. In the case of using the water-soluble organic solvent, the content of the water-soluble organic solvent is usually about 0.1% to 20% by mass in the primer composition, but it is preferable not to use the water-soluble organic solvent from the viewpoint of drying property.

Examples of the preservability improver include hindered amine, an ultraviolet absorber, and an antioxidant. Examples of the hindered amine include N—$CH_3$ type, N—H type, and N—OR type hindered amines. Examples of the ultraviolet absorber include a benzophenone-based ultraviolet absorber, a benzotriazole-based ultraviolet absorber, a salicylate-based ultraviolet absorber, a hydroxyphenyl triazine-based ultraviolet absorber, a cyanoacrylate-based ultraviolet absorber, and a nickel complex salt-based ultraviolet absorber. Examples of the antioxidant include a phenol-based antioxidant, an amine-based antioxidant, a sulfur-based antioxidant, and a phosphorus-based antioxidant. In the case of using the preservability improver, the content of the preservability improver is usually about 0.05% to 1% by mass in the primer composition.

Examples of the defoaming agent include a silicone-based defoaming agent and a Pluronic (registered trademark)-based defoaming agent. In the case of using the defoaming agent, the content of the defoaming agent is usually about 0.05% to 1% by mass in the primer composition.

Examples of the adhesive property imparting agent include a silane coupling agent. In the case of using the adhesive property imparting agent, the content of the adhesive property imparting agent is usually about 0.5% to 5% by mass in the primer composition.

Examples of the filler include extender pigments such as calcium carbonate, silica, kaolin, clay, and barium sulfate. In the case of using the filler, the content of the filler is usually about 0.1% to 10% by mass in the primer composition.

Examples of the thickener include inorganic thickeners, polysaccharides and derivatives thereof, and various high molecular compounds. In the case of using the thickener, the content of the thickener is usually about 0.1% to 10% by mass in the primer composition.

<Production of Primer Composition>

The primer composition is not particularly limited, and can be produced by, for example, adding the resin emulsion, the aggregation accelerator, the surfactant, and if necessary, various additives and the like to water, and stirring and mixing the mixture using a disper or the like.

<Ink Set>

The ink set of the present invention includes the primer composition and an aqueous inkjet ink composition.

The aqueous inkjet ink composition is not particularly limited, and known aqueous inkjet ink compositions can be used, and examples thereof include an ink composition containing a pigment, an alkali-soluble resin, a resin emulsion, a surfactant, a water-soluble solvent, and water.

As the pigment, organic pigments and inorganic pigments used in aqueous inkjet ink compositions can be used. Examples of the organic pigments include dye lake pigments, azo-based pigments, benzimidazolone-based pigments, phthalocyanine-based pigments, quinacridone-based pigments, anthraquinone-based pigments, dioxazine-based pigments, indigo-based pigments, thioindico-based pigments, perylene-based pigments, perinone-based pigments, diketopyrrolopyrrole-based pigments, isoindolinone-based pigments, nitro-based pigments, nitroso-based pigments, anthraquinone-based pigments, flavanthrone-based pigments, quinophthalone-based pigments, pyranthrone-based pigments, and indanthrone-based pigments. Examples of the inorganic pigments include carbon black, titanium oxide, zinc oxide, red iron oxide, graphite, black iron oxide, chrome oxide green, and aluminum hydroxide. The pigment may be subjected to a surface treatment using a known surface treatment agent. The pigments can be used singly or in combination of two or more kinds thereof.

Specific examples of the pigments for each typical hue include the following.

Examples of yellow pigments include C.I. Pigment Yellows 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, and 213.

Examples of magenta pigments include C.I. Pigment Reds 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, and 270, and C.I. Pigment Violet 19.

Examples of cyan pigments include C.I. Pigment Blues 1, 2, 3, 15, 15:1, 15:2, 15:3, 15:4, 15:6, 16, 18, 22, 27, 29, and 60.

Examples of black pigments include carbon black (C.I. Pigment Black 7).

Examples of white pigments include titanium oxide and aluminum oxide, and the white pigments may be subjected to a surface treatment using various materials such as alumina and silica.

The proportion of the pigment in the aqueous inkjet ink composition is preferably 1% by mass or more, more preferably 2% by mass or more from the viewpoint of improving the print density of printed matter, and is preferably 10% by mass or less, more preferably 8% by mass or less from the viewpoint of improving discharge stability. However, when the pigment is a white pigment, the proportion of the white pigment is preferably 4% by mass or more, more preferably 8% by mass or more and preferably 30% by mass or less, more preferably 20% by mass or less in the aqueous inkjet ink composition.

<Alkali-Soluble Resin>

The alkali-soluble resin is an ordinary alkali-soluble resin that can be used for pigment dispersion of inks and paints or as a binder, is not particularly limited as long as the alkali-soluble resin can be dissolved in an aqueous medium in the presence of a basic compound, and is preferably a resin containing one or two or more anionic groups such as a carboxyl group, a sulfonic group, and a phosphonic acid group ($-P(=O)(OH_2)$).

The alkali-soluble resin preferably further has a hydrophobic moiety for improving the adsorption mainly on the pigment in the molecule. Examples of the hydrophobic moiety introduced into the molecule include hydrophobic groups such as a long-chain alkyl group and an alicyclic or aromatic cyclic hydrocarbon group.

The acid value of the alkali-soluble resin is preferably 40 mg KOH/g or more, more preferably 70 mg KOH/g or more from the viewpoint of increasing the solubility in an aqueous medium. The acid value of the alkali-soluble resin is preferably 300 mg KOH/g or less, more preferably 250 mg KOH/g or less from the viewpoint of improving the water resistance of printed matter. The acid value is a theoretical acid value of the mg number of potassium hydroxide theoretically required to neutralize 1 g of alkali-soluble resin, which is arithmetically determined based on the composition of the monomer used for synthesizing the alkali-soluble resin.

The glass transition temperature of the alkali-soluble resin is preferably 0° C. or more, more preferably 10° C. or more from the viewpoint of improving the blocking resistance of printed matter. The glass transition temperature of the alkali-soluble resin is preferably 100° C. or less, more preferably 80° C. or less from the viewpoint of improving the folding resistance of printed matter.

The glass transition temperature of the alkali-soluble resin is a theoretical glass transition temperature determined by the following Wood equation when the alkali-soluble resin is an acrylic copolymer resin.

$$1/Tg = W1/Tg1 + W2/Tg2 + W3/Tg3 + \ldots + Wx/Tgx \quad \text{Wood equation:}$$

[where, Tg1 to Tgx represent the glass transition temperature of homopolymer of each of the monomers 1, 2, 3 . . . x that constitute the alkali-soluble resin, W1 to Wx represent the polymerization fraction of each of the monomers 1, 2, 3 . . . x, and Tg represents the theoretical glass transition temperature. However, the glass transition temperature in the Wood equation is the absolute temperature.]

The glass transition temperature of the alkali-soluble resin is a theoretical glass transition temperature determined by thermal analysis when the alkali-soluble resin is a resin other than the acrylic copolymer resin. As the method of thermal analysis, as an example, the glass transition temperature can be measured in conformity with JIS K7121 (Testing Methods for Transition Temperatures of Plastics) using Pyris1 DSC manufactured by PerkinElmer Co., Ltd. under the conditions of a rate of temperature rise of 20° C./min and a nitrogen gas flow velocity of 20 ml/min.

The weight average molecular weight of the alkali-soluble resin is preferably 5,000 or more, more preferably 10,000 or more from the viewpoint of improving the water resistance of printed matter. The weight average molecular weight of the alkali-soluble resin is preferably 100,000 or less, more preferably 50,000 or less from the viewpoint of increasing the solubility in an aqueous medium.

The weight average molecular weight can be measured by the gel permeation chromatography (GPC). As an example, the weight average molecular weight in terms of polystyrene can be determined by performing chromatography using Water 2690 (manufactured by Waters Corporation) as a GPC instrument, and PLgel, 5μ, and MIXED-D (manufactured by Polymer Laboratories Inc.) as a column under the conditions of a tetrahydrofuran as a developing solvent, a column temperature of 25° C., a flow velocity of 1 ml/min, an RI detector, a sample injection concentration of 10 mg/ml, and an injection volume of 100 μl.

Examples of the alkali-soluble resin include an acrylic copolymer resin, a maleic acid-based copolymer resin, a polyester resin obtained by a polycondensation reaction, and a polyurethane resin. Materials for synthesizing such alkali-soluble resins are disclosed, for example, in JP-A-2000-94825, and it is possible to use an acrylic copolymer resin, a maleic acid-based copolymer resin, a polyester-based resin, a polyurethane-based resin and the like that are obtained using the materials described in the publication. Furthermore, it is also possible to use resins obtained using materials other than these materials. The alkali-soluble resins can be used singly or in combination of two or more kinds thereof.

As the acrylic copolymer resin, for example, one obtained by polymerizing a mixture of other monomers copolymerizable with an anionic group-containing monomer in a solvent in the presence of an ordinary radical generator (for example, benzoyl peroxide, tert-butyl peroxybenzoate, or azobisisobutyronitrile) can be used.

Examples of the anionic group-containing monomer include monomers having at least one anionic group selected from the group consisting of a carboxyl group, a sulfonic acid group, and a phosphonic acid group, and among these, a monomer having a carboxyl group is particularly preferable.

Examples of the monomer having a carboxyl group include acrylic acid, methacrylic acid, crotonic acid, itaconic acid, maleic acid, fumaric acid, 2-carboxyethyl (meth)acrylate, 2-carboxypropyl (meth) acrylate, maleic anhydride, fumaric anhydride, and maleic acid half ester. Examples of the monomer having a sulfonic acid group include sulfoethyl methacrylate. Examples of the monomer having a phosphonic acid group include phosphonoethyl methacrylate.

As the other monomers copolymerizable with an anionic group-containing monomer, it is preferable to contain a hydrophobic group-containing monomer from the viewpoint of improving the adsorption on the pigment.

Examples of the hydrophobic group-containing monomer include, as a monomer having a long-chain alkyl group, alkyl esters having 8 or more carbon atoms of a radically polymerizable unsaturated carboxylic acid such as (meth)acrylic acid (for example, 2-ethylhexyl (meth)acrylate, octyl (meth)acrylate, lauryl (meth) acrylate, stearyl (meth) acrylate, 2-hydroxystearyl (meth)acrylate and the like), alkyl vinyl ethers having 8 or more carbon atoms (for example, dodecyl vinyl ether and the like), and vinyl esters of a fatty acid having 8 or more carbon atoms (for example, vinyl 2-ethylhexanoate, vinyl laurate, vinyl stearate and the like); as a monomer having an alicyclic hydrocarbon group, cyclohexyl (meth)acrylate and the like; and as a monomer having an aromatic hydrocarbon group, styrene-based monomers such as benzyl (meth)acrylate, styrene, α-methylstyrene, and vinyltoluene. The hydrophobic group-containing monomers can be used singly or in combination of two or more kinds thereof.

As the other monomers copolymerizable with an anionic group-containing monomer, a hydrophilic group-containing monomer can be contained from the viewpoint of suppressing aggregation of the alkali-soluble resin in an aqueous medium.

Examples of the hydrophilic group-containing monomer include, as a monomer having a (poly)oxyalkylene chain, esterified products of a (poly)alkylene glycol in which one terminal is capped with alkyl such as methoxy polyethylene glycol, methoxy polyethylene polypropylene glycol, ethoxy polyethylene glycol, ethoxy polyethylene polypropylene glycol, propoxy polyethylene glycol, and propoxy polyethylene polypropylene glycol, and a radically polymerizable unsaturated carboxylic acid such as (meth)acrylic acid, and ethylene oxide adducts and/or propylene oxide adducts of a radically polymerizable unsaturated carboxylic acid such as (meth)acrylic acid; as a basic group-containing monomer, vinylpyrrolidones such as 1-vinyl-2-pyrrolidone and 1-vinyl-3-pyrrolidone, vinylpyridines such as 2-vinylpyridine, 4-vinylpyridine, 5-methyl-2-vinylpyridine, and 5-ethyl-2-vinylpyridine, vinyl imidazoles such as 1-vinyl imidazole and 1-vinyl methylimidazole, vinylpiperidines such as 3-vinylpiperidine and N-methyl-3-vinylpiperidine, nitrogen-containing derivatives of (meth)acrylic acid such as dimethylaminoethyl (meth) acrylate, diethylaminoethyl (meth) acrylate, tertiary-butylaminoethyl (meth) acrylate, (meth) acrylamide, N-methylol (meth)acrylamide, N-butoxymethyl (meth)acrylamide, N-methoxy (meth)acrylamide, N-ethoxy (meth)acrylamide, N-dimethylacrylamide, and N-propylacrylamide; as a monomer having a hydroxyl group, hydroxyalkyl esters of (meth)acrylic acid such as hydroxyethyl (meth)acrylate and hydroxypropyl (meth)acrylate; and as a monomer having an epoxy group, glycidyl (meth) acrylate. The hydrophilic group-containing monomers can be used singly or in combination of two or more kinds thereof.

Examples of the hydrophobic group-containing monomer and other copolymerizable monomers other than hydrophilic group-containing monomers include alkyl esters having less than 8 carbon atoms of (meth)acrylic acid such as methyl (meth)acrylate, ethyl (meth)acrylate, propyl (meth)acrylate, isopropyl (meth)acrylate, butyl (meth)acrylate, and hexyl (meth)acrylate. The hydrophobic group-containing monomers and other copolymerizable monomers other than hydrophilic group-containing monomers can be used singly or in combination of two or more kinds thereof.

As the alkali-soluble resin, a bifunctional or higher functional crosslinker may be used from the viewpoint of appropriately crosslinking the resin and thus suppressing the aggregation of pigment.

The bifunctional or higher functional crosslinker is only required to have two or more reactive functional groups in the molecule to react with the functional groups of the alkali-crosslinkable resin. Examples of the reactive functional groups include an epoxy group, a hydroxyl group, an isocyanate group, an amino group, and an aziridine group. The bifunctional or higher functional crosslinkers can be used singly or in combination of two or more kinds thereof.

The content of the alkali-soluble resin is preferably 5 parts by mass or more, more preferably 15 parts by mass or more with respect to 100 parts by mass of the pigment from the viewpoint of increasing the dispersibility of pigment. The content of the alkali-soluble resin is preferably 100 parts by mass or less, more preferably 80 parts by mass or less, still more preferably 60 parts by mass or less with respect to 100 parts by mass of the pigment from the viewpoint of decreasing the viscosity of the aqueous inkjet composition.

<Resin Emulsion>

As the resin emulsion, known resin emulsions used in aqueous inkjet ink compositions can be used, and examples of the resin emulsion include an acrylic resin emulsion, a styrene-acrylic resin emulsion, a polyester-based resin emulsion, a polyurethane-based resin emulsion, a polyvinyl acetate-based resin emulsion, a polyvinyl chloride-based resin emulsion, a polybutadiene-based resin emulsion, and a polyolefin-based resin emulsion. In the resin emulsion, the glass transition temperature of the resin is preferably 20° C. or less from the viewpoint of improving the drying property of the coating film of printed matter and the adhesion to the substrate. The glass transition temperature is determined by differential scanning calorimetry (DSC) and is usually calculated at the midpoint of the temperature range in which the glass transition occurs. The resin emulsions can be used singly or in combination of two or more kinds thereof.

The proportion of (resin) solids in the resin emulsion in the aqueous inkjet ink composition is preferably 1% by mass or more, preferably 3% by mass or more from the viewpoint of improving print image quality and abrasion resistance, and is preferably 10% by mass or less, more preferably 8% by mass or less from the viewpoint of improving print image quality and storage stability.

<Surfactant>

As the surfactant, known surfactants used in aqueous inkjet ink compositions can be used, and examples of the surfactant include a nonionic surfactant, a cationic surfactant, an anionic surfactant, and a betaine surfactant. Specific examples of the surfactant include a silicone-based surfactant, a fluorine-based surfactant, and an acetylene-based surfactant. The surfactants can be used singly or in combination of two or more kinds thereof.

The proportion of the surfactant in the aqueous inkjet ink composition is preferably 0.1% by mass or more, more preferably 0.5% by mass or more from the viewpoint of improving dot expandability and solid uniformity of printed matter, and is preferably 3% by mass or less, more preferably 2% by mass or less from the viewpoint of improving storage stability.

<Water-Soluble Solvent>

As the water-soluble solvent, known water-soluble solvents used in aqueous inkjet ink compositions can be used, and examples of the water-soluble solvent include monoalcohols, polyhydric alcohols, lower alkyl ethers of polyhydric alcohols, nitrogen-containing compounds, ketones, ethers, and esters. The water-soluble solvents can be used singly or in combination of two or more kinds thereof.

Examples of the monoalcohols include methanol, ethanol, 1-propanol, 1-butanol, and 3-methoxy-3-methyl-1-butanol.

Examples of the polyhydric alcohols include ethylene glycol, propylene glycol, glycerin, diethylene glycol, 1,3-butylene glycol, 1,4-butylene glycol, 1,2-pentanediol, 1,5-pentanediol, neopentyl glycol, 1,2-hexanediol, 1,6-hexanediol, 1,2-cyclohexanediol, heptanediol, and 1,8-octanediol.

Examples of the lower alkyl ethers of polyhydric alcohols include ethylene glycol monomethyl ether, ethylene glycol dimethyl ether, ethylene glycol monoethyl ether, ethylene glycol diethyl ether, ethylene glycol monopropyl ether, ethylene glycol isopropyl ether, ethylene glycol monobutyl ether, ethylene glycol isobutyl ether, propylene glycol monomethyl ether, propylene glycol monoethyl ether, propylene glycol monopropyl ether, propylene glycol monobutyl ether, diethylene glycol monomethyl ether, diethylene glycol monoethyl ether, dipropylene glycol mono-n-propyl ether, and dipropylene glycol mono-n-butyl ether.

Examples of the nitrogen-containing compounds include pyrrolidone and N-methyl-2 pyrrolidone.

Examples of the ketones include acetone, methyl ethyl ketone, methyl butyl ketone, methyl isobutyl ketone, diisopropyl ketone, cyclopentanone, and cyclohexanone.

Examples of the ethers include isopropyl ether, n-butyl ether, tetrahydrofuran, tetrahydropyran, and 1,4-dioxane.

Examples of the esters include propylene carbonate, methyl acetate, ethyl acetate, propyl acetate, isopropyl acetate, butyl acetate, isobutyl acetate, amyl acetate, ethyl lactate, ethyl butyrate, dibutyl phthalate, and dioctyl phthalate; and cyclic esters such as ε-caprolactone and ε-caprolactam.

The water-soluble solvent preferably contains at least one selected from the group consisting of monoalcohols, polyhydric alcohols, lower alkyl ethers of polyhydric alcohols, and nitrogen-containing compounds, and more preferably contains at least one selected from the group consisting of propylene glycol, glycerin, diethylene glycol, ethylene glycol monobutyl ether, diethylene glycol monobutyl ether, and 3-methoxy-3-methyl-1-butanol from the viewpoints of suppression of drying of the ink composition in the inkjet nozzle and ease of formation of an ink layer (film) on the substrate.

The proportion of the water-soluble solvent in the aqueous inkjet ink composition is preferably 15% by mass or more, more preferably 20% by mass or more from the viewpoint of improving the discharge stability, and is preferably 60% by mass or less, more preferably 50% by mass or less from the viewpoint of improving the drying property of coating film.

<Water>

The water of the present invention includes water as an aqueous medium contained in a pigment dispersion to be described later, water added to adjust the concentration of the aqueous inkjet ink composition of the present invention, and the like. Examples of the water include ion exchanged water, pure water, distilled water, and industrial water. The water can be used singly or in combination of two or more kinds thereof.

The proportion of the water (including water contained in each component) in the aqueous inkjet ink composition is preferably 40% by mass or more, more preferably 50% by mass or more from the viewpoint of improving the drying property of coating film, and is preferably 70% by mass or less, more preferably 60% by mass or less from the viewpoint of improving the discharge stability.

<Basic Compound>

The aqueous inkjet ink composition preferably contains a basic compound from the viewpoint of dissolving the alkali-soluble resin. Examples of the basic compound include inorganic basic compounds such as sodium hydroxide and potassium hydroxide; and organic basic compounds such as ammonia, methylamine, ethylamine, monoethanolamine, N,N-dimethylethanolamine, N,N-diethylethanolamine, N,N-dibutylethanolamine, diethanolamine, N-methyldiethanolamine, triethanolamine, morpholine, N-methylmorpholine, and N-ethylmorpholine. The basic compounds can be used singly or in combination of two or more kinds thereof.

The proportion of the basic compound in the aqueous inkjet ink composition is only required to be an amount in which the alkali-soluble resin is dissolved in a medium, but is usually preferably 0.05% by mass or more, more preferably 0.1% by mass or more from the viewpoint of increasing the dispersion stability of the alkali-soluble resin, and is preferably 1% by mass or less, more preferably 0.5% by mass or less from the viewpoint of increasing the water resistance of printed matter.

To the aqueous inkjet ink composition of the present invention, known additives such as a resin, a pigment dispersant, an antifungal agent, a rust inhibitor, a thickener, an antioxidant, an ultraviolet absorber, a preservability improver, a defoaming agent, and a pH adjuster can be further added depending on the purpose.

<Method for Preparing Aqueous Inkjet Ink Composition>

The method for preparing (producing) the aqueous inkjet ink composition is not particularly limited, and the components may be added in order or simultaneously and mixed. Examples thereof include method (1) in which an aqueous resin varnish in which an alkali-soluble resin is dissolved in water in the presence of the basic compound, a pigment, and if necessary, a pigment dispersant and the like are mixed, then a pigment dispersion (ink base) is prepared using various dispersers such as a ball mill, an attritor, a roll mill, a sand mill, and an agitator mill, and the remaining materials are further added to prepare an aqueous inkjet ink composition; and method (2) in which a pigment is dispersed by the above-mentioned method, then a resin-coated pigment in which an alkali-soluble resin is deposited on the pigment surface is obtained by, for example, an acid deposition method or an ion exchange method described in Republished patent WO 2005/116147, then the obtained resin-coated pigment is neutralized with a basic compound and redispersed in water using various dispersers (such as a high-speed stirrer), and the remaining materials are further added to prepare an aqueous inkjet ink composition.

The initial viscosity of the aqueous inkjet ink composition after production is 2.0 to 15.0 mPa·s, preferably in a range of 3.0 to 12.0 mPa·s. The viscosity can be measured by, for example, an E-type viscometer (trade name "RE100L type viscometer" manufactured by Toki Sangyo Co., Ltd).

<Printed Matter>

The printed matter of the present invention is obtained by performing printing using an ink set including the aqueous inkjet ink composition and the primer composition. Specifically, the printed matter is obtained by an image formation method in which the primer composition is applied to a substrate and dried to form a primer layer, and then the aqueous inkjet ink composition is printed on the primer layer using an inkjet printer. Examples of the application method of the primer composition include application methods in which various application apparatuses such as a blade coater, an air knife coater, a roll coater, a bar coater, a gravure coater, a rod blade coater, a lip coater, a curtain coater, a die coater, and an inkjet are used.

For the printing method by an inkjet method, conventionally known conditions can be appropriately adopted, and examples thereof include a method in which inkjet printing is performed by housing the primer composition (or the aqueous inkjet ink composition) in an ink cartridge, attaching the ink cartridge to an inkjet recording apparatus of, for example, a single pass system, and ejecting the primer composition (or the aqueous inkjet ink composition) through the nozzle to the substrate (or primer layer).

Examples of the substrate include nonabsorbable printing media such as coated paper such as art paper, inkjet dedicated paper, and inkjet glossy paper, and plastic-based substrates such as a polyolefin film, a polyester film, a nylon film, and a polyvinyl chloride sheet; uncoated paper such as plain paper and offset paper; and a fabric such as cotton, and among these, nonabsorbable printing media are preferable, and plastic-based substrates are more preferable from the viewpoint of favorable adhesion of the primer layer.

EXAMPLES

Hereinafter, the present invention will be described with reference to Examples and the like, but the present invention is not limited thereto.

Production Example 1

<Production of Pigment Dispersion (Black Ink Base)>

Dissolved was 25 parts by mass of alkali-soluble resin (acrylic acid/lauryl acrylate/benzyl methacrylate/styrene copolymer), weight average molecular weight: 30,000, acid value: 185 mg KOH/g, glass transition temperature: 40° C.) in a mixed solution of 3.9 parts by mass of potassium hydroxide and 77.1 parts by mass of water to obtain an aqueous resin varnish containing solids of the alkali-soluble resin at 25% by mass. Next, 48 parts by mass of water was added to and mixed with 32 parts by mass of the aqueous resin varnish to prepare a resin varnish for pigment dispersion. To this resin varnish for pigment dispersion, 20 parts by mass of carbon black (trade name "Printex 90" manufactured by Orion Engineered Carbons) as a pigment was further added, and the mixture was stirred and mixed and then milled using a wet circulation mill to produce a black pigment dispersion (black ink base).

<Production of Aqueous Inkjet Ink Composition>

An aqueous inkjet ink composition was produced by stirring and mixing 42 parts by mass of the black pigment dispersion (black ink base), 5 parts by mass of styrene-acrylic resin emulsion (trade name "Neocryl A-1092" manufactured by DSM, solids: 48.5%, glass transition temperature: 6° C.) as a resin emulsion, 1 part by mass of acetylene-based surfactant (trade name "OLFINE E-1010" manufactured by Nisshin Chemical Industry Co., Ltd., active ingredient: 100%, HLB: 13) as a surfactant, 35 parts by mass of propylene glycol as a water-soluble solvent, and 17 parts by mass of water.

Example 1

<Production of Primer Composition>

The primer composition of Example 1 was produced by stirring and mixing calcium acetate as an aggregation accelerator, an acetylene-based surfactant (trade name "OLFINE E-1010" manufactured by Nisshin Chemical Industry Co., Ltd., active ingredient: 100%, HLB: 13) as a surfactant (A), a polyoxyethylene fatty acid glyceryl (trade name "NIKKOL TMGS-15V" manufactured by Nikko Chemicals Co., Ltd., active ingredient: 100%, HLB: 13.5, having two polyoxyethylene groups in the molecule) as a surfactant (B), and a polyolefin-based resin emulsion (trade name "SUPERCHLON E-604" manufactured by Nippon Paper Industries, Ltd., solids: 40%, chlorinated polypropylene emulsion) as a resin emulsion in water so that the mass proportions were as presented in Table 1.

<Fabrication of Primer Layer>

The primer composition produced above was applied to each of an OPP film (trade name "P2161" manufactured by Toyobo Co., Ltd., 25 μm), a PET film (trade name "E5100" manufactured by Toyobo Co., Ltd., 12 μm), a nylon film (trade name "N1100" manufactured by Toyobo Co., Ltd., 15 μm), and coated paper (trade name "OK TopKote+" manufactured by Oji Paper Co., Ltd.) using a #4 bar coater and dried by heating to fabricate each primer layer of Example 1. The film thickness of each primer layer was 1 μm.

Examples 2 to 21 and Comparative Examples 1 to 5

<Production of Primer Composition and Fabrication of Primer Layer>

Primer compositions of the respective Examples and Comparative Examples were produced by the same method as in Example 1 except that the raw materials used and the amounts thereof were changed as presented in Tables 1 to 3 in the production of primer composition, and the respective primer layers were fabricated by the same method as in Example 1.

<Storage Stability>

Each of the primer compositions produced above was filled in a glass bottle and left to stand at 60° C. for 7 days, and then the state of separation of the primer composition and the presence or absence of precipitates was visually observed and evaluated according to the following criteria.

[Evaluation Criteria]
  ○: The liquid phase is uniform without separation or precipitates.

Δ: Separation of the liquid phase and precipitates are slightly observed.

x: Separation of the liquid phase and precipitates are observed or the liquid phase is ununiform.

<Bleeding Resistance>

The aqueous inkjet ink composition produced above was packed in the cartridge of an ink jet printer ("PX 105" manufactured by Seiko Epson Corporation), a thin line of about 0.3 mm was printed on the surface of each primer layer fabricated above, and thickening due to bleeding was observed and evaluated according to the following criteria.

[Evaluation Criteria]

○: There is no bleeding and printing is performed in the thickness of the thin line itself.

Δ: Partial thickening is observed but thickening by two times or more is not observed.

x: Thickening by two times or more is observed on the whole.

<Printability of Solid Image>

The aqueous inkjet ink composition produced above was packed in the cartridge of an ink jet printer ("PX 105" manufactured by Seiko Epson Corporation), a solid image of 5 cm×5 cm was printed on the surface of each primer layer fabricated above, and the obtained image-formed product was visually observed and evaluated according to the following criteria.

[Evaluation Criteria]

○: There is no bleeding, unevenness, or streaks.

Δ: Unevenness and streaks are slightly observed (practically usable).

x: Bleeding, unevenness, and streaks are visually confirmed (practically unusable).

<Transparency>

Each primer layer fabricated above was heated in an oven at a humidity of 90% RH and a temperature of 40° C. for 24 hours, and then the state of each primer layer was visually observed and evaluated according to the following criteria.

[Evaluation Criteria]

○: The primer layer is transparent.

Δ: The primer layer is slightly cloudy (practically usable).

x: The primer layer is obviously cloudy (practically unusable).

TABLE 1

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Aggregation accelerator | Calcium acetate | 0.1 | 2.0 | 10.0 | — | — | — | — | 2.0 | 2.0 | 2.0 | 2.0 |
| | Calcium chloride | — | — | — | 1.3 | — | — | — | — | — | — | — |
| | Magnesium chloride | — | — | — | — | 1.1 | — | — | — | — | — | — |
| | Citric acid | — | — | — | — | — | 2.2 | — | — | — | — | — |
| | Succinic acid | — | — | — | — | — | — | 1.3 | — | — | — | — |
| Surfactant (A) | Acetylene-based | 0.5 | 0.5 | 0.5 | 0.5 | 0.5 | 0.5 | 0.5 | 0.5 | 0.5 | 0.5 | 0.5 |
| | Silicone-based | — | — | — | — | — | — | — | — | — | — | — |
| Surfactant (B) | NIKKOL TMGS-15V | 0.5 | 0.5 | 0.5 | 0.5 | 0.5 | 0.5 | 0.5 | 0.01 | 1.0 | — | — |
| | AMIET 320 | — | — | — | — | — | — | — | — | — | 0.5 | — |
| | NIKKOL TS-10V | — | — | — | — | — | — | — | — | — | — | 0.5 |
| Resin emulsion | Polyolefin-based resin | 5.0 | 5.0 | 5.0 | 5.0 | 5.0 | 5.0 | 5.0 | 5.0 | 5.0 | 5.0 | 5.0 |
| | Styrene-acrylic resin | — | — | — | — | — | — | — | — | — | — | — |
| | Polyester-based resin | — | — | — | — | — | — | — | — | — | — | — |
| | Polyvinyl acetate-based resin | — | — | — | — | — | — | — | — | — | — | — |
| Water | | 93.9 | 92.0 | 84.0 | 92.7 | 92.9 | 91.8 | 92.7 | 92.49 | 91.5 | 92.0 | 92.0 |
| Total | | 100.0 | 100.0 | 100.0 | 100.0 | 100.0 | 100.0 | 100.0 | 100.0 | 100.0 | 100.0 | 100.0 |
| Storage stability | | ○ | ○ | Δ | ○ | ○ | ○ | ○ | ○ | ○ | ○ | ○ |
| Bleeding resistance | | Δ | ○ | ○ | ○ | ○ | ○ | ○ | ○ | Δ | ○ | ○ |
| Printability of solid image | | ○ | ○ | ○ | ○ | ○ | ○ | ○ | Δ | ○ | ○ | ○ |
| Transparency | | ○ | ○ | ○ | ○ | ○ | ○ | ○ | ○ | Δ | ○ | ○ |

TABLE 2

| | | Example | | | | | | | | | |
|---|---|---|---|---|---|---|---|---|---|---|---|
| | | 12 | 13 | 14 | 15 | 16 | 17 | 18 | 19 | 20 | 21 |
| Aggregation accelerator | Calcium acetate | 2.0 | 2.0 | 2.0 | 2.0 | 2.0 | 2.0 | 2.0 | 2.0 | 2.0 | 2.0 |
| | Calcium chloride | — | — | — | — | — | — | — | — | — | — |
| | Magnesium chloride | — | — | — | — | — | — | — | — | — | — |
| | Citric acid | — | — | — | — | — | — | — | — | — | — |
| | Succinic acid | — | — | — | — | — | — | — | — | — | — |
| Surfactant (A) | Acetylene-based | 0.5 | 0.5 | 0.01 | 1.0 | — | 0.5 | 0.5 | 0.5 | 0.5 | 0.5 |
| | Silicone-based | — | — | — | — | 0.5 | — | — | — | — | — |
| Surfactant (B) | NIKKOL TMGS-15V | 0.5 | 0.5 | 0.5 | 0.5 | 0.5 | 0.5 | 0.5 | 0.5 | 0.5 | 0.5 |
| | AMIET 320 | 0.5 | — | — | — | — | — | — | — | — | — |
| | NIKKOL TS-10V | — | 0.5 | — | — | — | — | — | — | — | — |

TABLE 2-continued

| | | Example | | | | | | | | | |
|---|---|---|---|---|---|---|---|---|---|---|---|
| | | 12 | 13 | 14 | 15 | 16 | 17 | 18 | 19 | 20 | 21 |
| Resin emulsion | Polyolefin-based resin | 5.0 | 5.0 | 5.0 | 5.0 | 5.0 | 0.5 | 10.0 | — | — | — |
| | Styrene-acrylic resin | — | — | — | — | — | — | — | 5.0 | — | — |
| | Polyester-based resin | — | — | — | — | — | — | — | — | 5.0 | — |
| | Polyvinyl acetate-based resin | — | — | — | — | — | — | — | — | — | 5.0 |
| Water | | 91.5 | 91.5 | 92.49 | 91.5 | 92.0 | 96.5 | 87.0 | 92.0 | 92.0 | 92.0 |
| Total | | 100.0 | 100.0 | 100.0 | 100.0 | 100.0 | 100.0 | 100.0 | 100.0 | 100.0 | 100.0 |
| Storage stability | | ○ | ○ | ○ | ○ | ○ | ○ | Δ | ○ | ○ | ○ |
| Bleeding resistance | | Δ | Δ | ○ | Δ | ○ | Δ | ○ | ○ | ○ | ○ |
| Printability of solid image | | ○ | ○ | ○ | ○ | ○ | ○ | ○ | ○ | ○ | ○ |
| Transparency | | ○ | ○ | ○ | ○ | ○ | ○ | ○ | ○ | ○ | ○ |

TABLE 3

| | | Comparative Example | | | | |
|---|---|---|---|---|---|---|
| | | 1 | 2 | 3 | 4 | 5 |
| Aggregation accelerator | Calcium acetate | 2.0 | 2.0 | 2.0 | 2.0 | 2.0 |
| Surfactant (A) | Acetylene-based | 0.5 | 0.5 | 0.5 | 0.5 | 0.5 |
| | Silicone-based | — | — | — | — | — |
| Surfactant (B) | NIKKOL TMGS-15V | — | 5.0 | — | — | — |
| | AMIET 320 | — | — | — | — | — |
| | NIKKOL TS-10V | — | — | — | — | — |
| Another surfactant | AMIET 105 | — | — | 0.5 | — | — |
| | NONION LT-280W | — | — | — | 0.5 | — |
| | EMULGEN 1108 | — | — | — | — | 0.5 |
| Resin emulsion | Polyolefin-based resin | 5.0 | 5.0 | 5.0 | 5.0 | 5.0 |
| | Styrene-acrylic resin | — | — | — | — | — |
| | Polyester-based resin | — | — | — | — | — |
| | Polyvinyl acetate-based resin | — | — | — | — | — |
| Water | | 92.5 | 87.5 | 92.0 | 92.0 | 92.0 |
| Total | | 100.0 | 100.0 | 100.0 | 100.0 | 100.0 |
| Storage stability | | ○ | ○ | X | ○ | ○ |
| Bleeding resistance | | ○ | X | ○ | X | ○ |
| Printability of solid image | | X | ○ | ○ | ○ | X |
| Transparency | | ○ | X | X | ○ | ○ |

As a surfactant (A) in Tables 1 to 3, the acetylene-based surfactant represents an acetylene diol EO adduct (trade name "OLFINE E-1010" manufactured by Nisshin Chemical Industry Co., Ltd., active ingredient: 100%, HLB value: 13); and the silicone-based surfactant represents a polysiloxane derivative (trade name "BYK-331" manufactured by BYK, active ingredient: 98%).

As a surfactant (B) in Tables 1 and 2,

NIKKOL TMGS-15V represents a polyoxyethylene fatty acid glyceryl (trade name "NIKKOL TMGS-15V" manufactured by Nikko Chemicals Co., Ltd., active ingredient: 100%, HLB value: 13.5, having two polyoxyethylene groups in the molecule);

AMIET 320 represents a polyoxyethylene aliphatic amine (trade name "AMIET 320" manufactured by Kao Corporation, active ingredient: 100%, HLB value: 15.4, having two polyoxyethylene groups in the molecule); and NIKKOL TS-10V represents a polyoxyethylene sorbitan fatty acid ester (trade name "NIKKOL TS-10V" manufactured by Nikko Chemicals Co., Ltd., active ingredient: 100%, HLB value: 14.9, having three polyoxyethylene groups in the molecule).

As a resin emulsion in Tables 1 to 3, the polyolefin-based resin emulsion represents a chlorinated polypropylene resin emulsion (trade name "SUPERCHLON E-604" manufactured by Nippon Paper Industries, Ltd., solids: 40%);

the styrene-acrylic resin emulsion is a styrene-acrylic resin emulsion (trade name "VINYBLAN 2687" manufactured by Nisshin Chemical Industry Co., Ltd., solids: 30%);

the polyester-based resin emulsion is a polyester-based polyurethane resin emulsion (trade name "NeoRez R-9330" manufactured by DSM, solids: 40%); and the polyvinyl acetate-based resin emulsion represents a vinyl acetate-based resin emulsion (trade name "VINYBLAN 1129" manufactured by Nisshin Chemical Industry Co., Ltd., solids: 52%).

As other surfactants in Table 3,

AMIET 105 represents a polyoxyethylene alkyl amine (trade name "AMIET 105" manufactured by Kao Corporation, active ingredient: 100%, HLB value: 9.8, having two polyoxyethylene groups in the molecule);

NONION LT-280W represents a polyoxyethylene sorbitan fatty acid ester (trade name "NONION LT-280W" manufactured by NOF CORPORATION, active ingredient: 100%, HLB value: 19.0, having three polyoxyethylene groups in the molecule); and EMULGEN 1108 represents a polyoxyethylene alkyl ether (trade name "EMULGEN 1108" manufactured by Kao Corporation, active ingredient: 100%, HLB value: 13.5, having one polyoxyethylene group in the molecule).

The invention claimed is:

1. A primer composition comprising a resin emulsion, an aggregation accelerator, a surfactant, and water, wherein
   the surfactant contains one or more surfactants (A) selected from the group consisting of an acetylene-based surfactant and a silicone-based surfactant and
   a nonionic surfactant (B) other than the surfactant (A),
   the nonionic surfactant (B) has an HLB value of 10 or more and less than 15.5 and has a plurality of polyoxyalkylene groups,
   the nonionic surfactant (B) is one or more nonionic surfactants selected from the group consisting of a polyoxyalkylene group-containing fatty acid glyceryl, a polyoxyalkylene group-containing aliphatic amine, and a polyoxyalkylene group-containing sorbitan fatty acid ester, and
   a proportion of the nonionic surfactant (B) in the primer composition is 3% by mass or less.

2. The primer composition according to claim 1, wherein a mass ratio of the surfactant (A) to the nonionic surfactant (B) (surfactant (A)/nonionic surfactant (B))) is 0.01 or more and 100 or less.

3. A primer layer formed from the primer composition according to claim 1.

4. An ink set comprising the primer composition according to claim 1 and an aqueous inkjet ink composition.

5. A printed matter obtained by performing printing using the ink set according to claim 4.

6. An image formation method using the ink set according to claim 4.

* * * * *